United States Patent
Baek

[19]

[11] Patent Number: 5,949,497
[45] Date of Patent: Sep. 7, 1999

[54] OPTIONAL OPERATION CONTROL APPARATUS FOR MONITOR AND CONTROL METHOD THEREOF

[75] Inventor: Woon Gil Baek, Kyungsangbook-Do, Rep. of Korea

[73] Assignee: LG Electronics Inc., Rep. of Korea

[21] Appl. No.: 08/612,025

[22] Filed: Mar. 6, 1996

[30] Foreign Application Priority Data

Sep. 3, 1995 [KR] Rep. of Korea .......................... 95-4822

[51] Int. Cl.⁶ .................................................. H04N 5/44
[52] U.S. Cl. .......................... 348/725; 348/705; 348/706; 348/734; 348/565
[58] Field of Search ..................................... 345/156, 168; 340/825.24, 825.25; 341/22, 26; 348/705, 706, 839, 552, 734, 565, 731, 566, 180, 189, 553, 725; H04N 5/44

[56] References Cited

U.S. PATENT DOCUMENTS

| | | | |
|---|---|---|---|
| 4,337,480 | 6/1982 | Bourassin et al. | 348/552 |
| 5,341,175 | 8/1994 | Koz | 348/552 |
| 5,402,183 | 3/1995 | Tanaka | 348/706 |
| 5,557,675 | 9/1996 | Schupak | 348/552 |
| 5,563,665 | 10/1996 | Chang | 348/552 |

*Primary Examiner*—Sherrie Hsia
*Attorney, Agent, or Firm*—Ostrolenk, Faber, Gerb & Soffen, LLP

[57] ABSTRACT

An improved optional operation control apparatus for a monitor and a control method thereof capable of controlling a function operation of an option card which is detected as being mounted therein after detecting whether a plurality of option cards are provided in the system, which includes a key input unit including a plurality of function keys; a microcomputer for judging whether a plurality of option cards are mounted in the system and for performing a corresponding function of an option card which is mounted therein in accordance with an input signal of the key input unit; a first and second switch unit, switched in accordance with a control of the microcomputer, for outputting a combined video signal outputted from an option card, of which its corresponding operation is performed, and a combined video signal inputted thereto through an external input terminal in accordance with a control of the microcomputer; and a signal processing unit for processing a combined video signal outputted from the first and second switch unit in accordance with a control of the microcomputer, outputting an audio signal to a speaker, and displaying a video signal on a color picture tube.

5 Claims, 4 Drawing Sheets

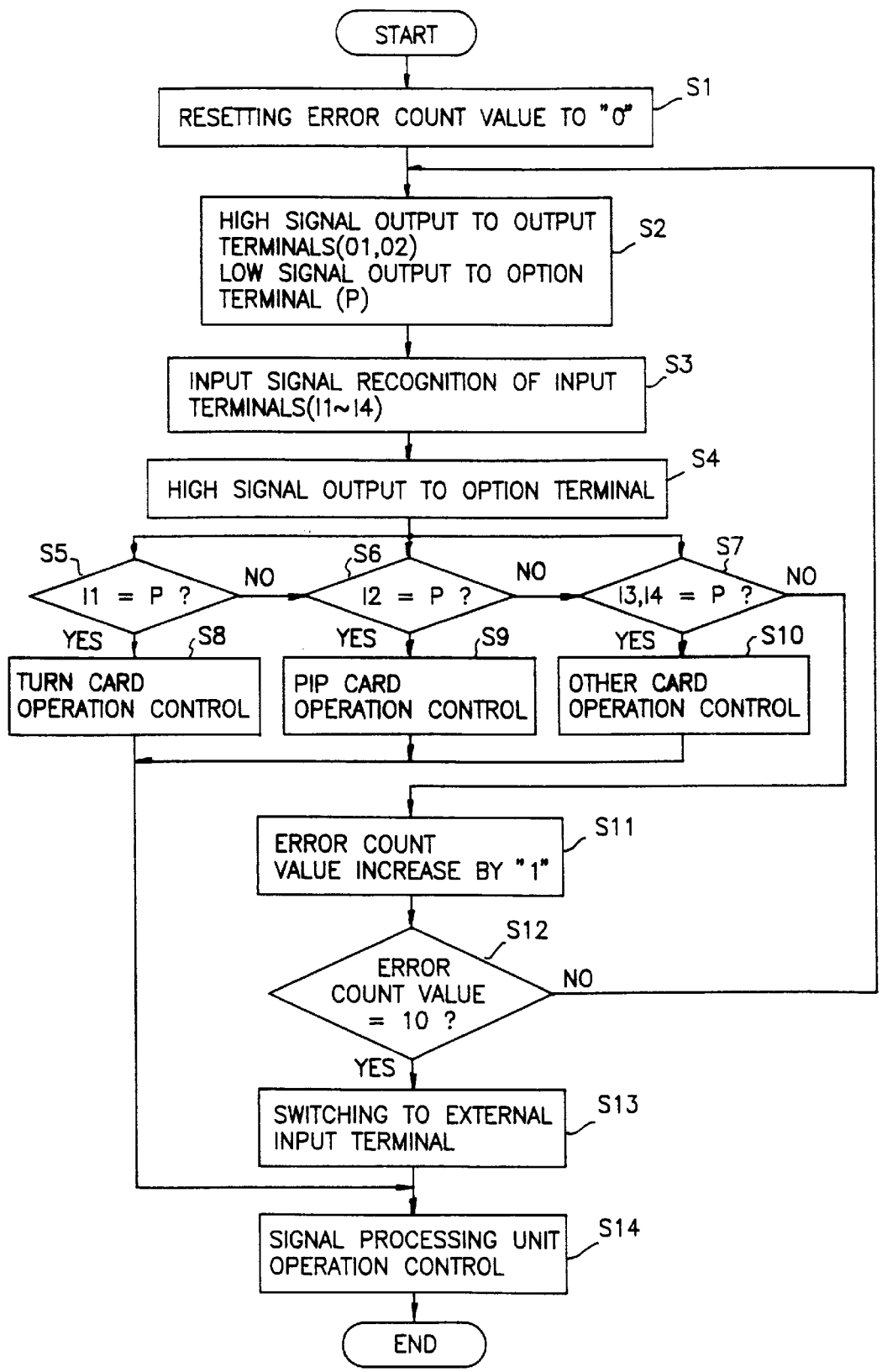

OPTIONAL OPERATION CONTROL APPARATUS FOR MONITOR AND CONTROL METHOD THEREOF

BACKGROUND OF THE INVENTION

1. Field of the Invention

The present invention relates to an optional operation control apparatus for a monitor and a control method thereof, and in particular to an improved optional operation control apparatus for a monitor and a control method thereof capable of controlling a function operation of an option card which is detected as being mounted therein after detecting whether a plurality of option cards are provided in the system.

2. Description of the Conventional Art

FIG. 1 shows a conventional monitor system, which includes a key input unit 1 provided with a plurality of function keys, a microcomputer 2 for controlling an operation of a monitor system in accordance with a key input signal outputted from the key input unit 1, a switch unit 3 for selectively outputting a combined video signal outputted from external input terminals EI1 and EI2, respectively, in accordance with a control of the microcomputer 2, an audio processing unit 4 for processing an audio signal of combined video signals outputted from the switch unit 3 in accordance with a control of the microcomputer 2, an amplifying unit 5 for amplifying an audio signal outputted from the audio processing unit 4 and for outputting to a speaker 6, a chrominance control unit 7 for processing a video signal of combined video signals outputted from the switch unit 3 in accordance with a control signal of the microcomputer 2 and for displaying on a color picture tube (CPT) 8, and a deflection control unit 9 for controlling a deflection of a video signal displayed on the CPT 8 in accordance with a control of the microcomputer 2.

The operation of a conventional monitor system will now be explained with reference to the accompanying drawing.

To begin with, when a user inputs a certain key (not shown) of the key input unit 1, the microcomputer 2 recognizes the key input and outputs first through fourth control signals in accordance with the recognition.

The audio processing 4 processes a sound pressure and level of an audio signal of combined video signals outputted from the switch unit 3 in accordance with a second control signal outputted from the microcomputer 2, and the thusly processed audio signal is amplified by the amplifying unit 5 to a predetermined level and outputted to the speaker 6.

The chrominance control unit 7 processes a video signal of combined video signals outputted from the switch unit 3 in accordance with a third control signal outputted from the microcomputer 2 and displays on the CPT 8.

The deflection control unit 9 controls a vertical and horizontal size and a side pin cushion of a video signal displayed on the CPT 8 in accordance with a fourth control signal outputted from the microcomputer 9.

Therefore, a combined video signal inputted thereto from the external input terminals EI1 and E12 is displayed on the CPT 8 and is outputted to the speaker 6, so that the user can watch pictures displayed on the screen.

However, since the conventional monitor system is equipped with simple functions of displaying a combined video signal externally inputted thereto in accordance with a microcomputer on the screen, and outputting an audio signal using a speaker, it is impossible to make a television set which is capable of performing various kinds of functions including a broadcast signal receiving function to satisfy the growing desire of users for that type of capability.

SUMMARY OF THE INVENTION

Accordingly, it is an object of the present invention to provide an optional operation control apparatus for a monitor and a control method thereof, which overcomes the problems encountered in a conventional optional operation control apparatus for a monitor and a control method thereof.

It is another object of the present invention to provide an improved optional operation control apparatus for a monitor and a control method thereof capable of controlling a function operation of an option card which is detected as being mounted therein after detecting whether a plurality of option cards are provided in the system.

To achieve the above objects, there is provided an optional operation control apparatus for a monitor, which includes a key input unit including a plurality of function keys; a microcomputer for judging whether a plurality of option cards are mounted in the system and for performing a corresponding function of an option card which is mounted therein in accordance with an input signal of the key input unit; a first and second switch unit, switched in accordance with a control of the microcomputer, for outputting a combined video signal outputted from an option card, of which its corresponding operation is performed, and a combined video signal inputted thereto through an external input terminal in accordance with a control of the microcomputer; and a signal processing unit for processing a combined video signal outputted from the first and second switch unit in accordance with a control of the microcomputer, outputting an audio signal to a speaker, and displaying a video signal on a color picture tube.

To achieve the above objects, there is provided an optional operation control method for a monitor, which includes the steps of a first step which resets an error counter to "0"; a second step which outputs a signal having a certain level to a plurality of output terminals so as to scanning a key input unit, outputs a signal having a certain level to an option terminal, and recognizes a level of a signal inputted to a plurality of input terminal, respectively; a third step which outputs an inverted signal of a signal outputted from the option terminal of the second step, compares the level of an output signal of the option terminal and the level of a signal recognized by the second step, and judges whether an option card is provided in the system as a result of the comparison; a fourth step which judges that an option card is not provided in the system when the levels of the signals are different from each other as a result of the comparison of the third step and controls an operation of a monitor; and a fifth step which judges that at least one option card is provided in the system when the levels of the signals are the same as a result of the comparison of the third step and controls an operation of the provided option card.

BRIEF DESCRIPTION OF THE DRAWINGS

FIG. 5 is a flow chart of an optional operation control method for a monitor according to the present invention.

DETAILED DESCRIPTION OF THE INVENTION

Figure 1:
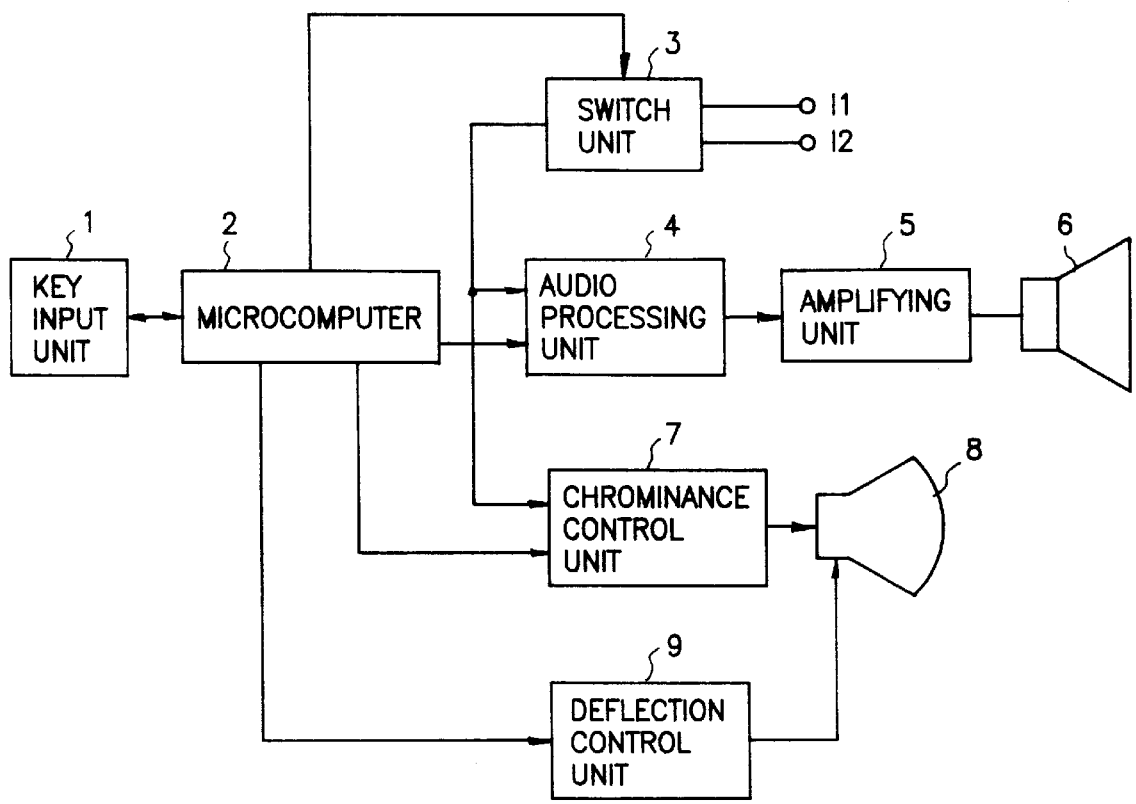
FIG. 1 is a block diagram of a conventional monitor system.
Figure 2:
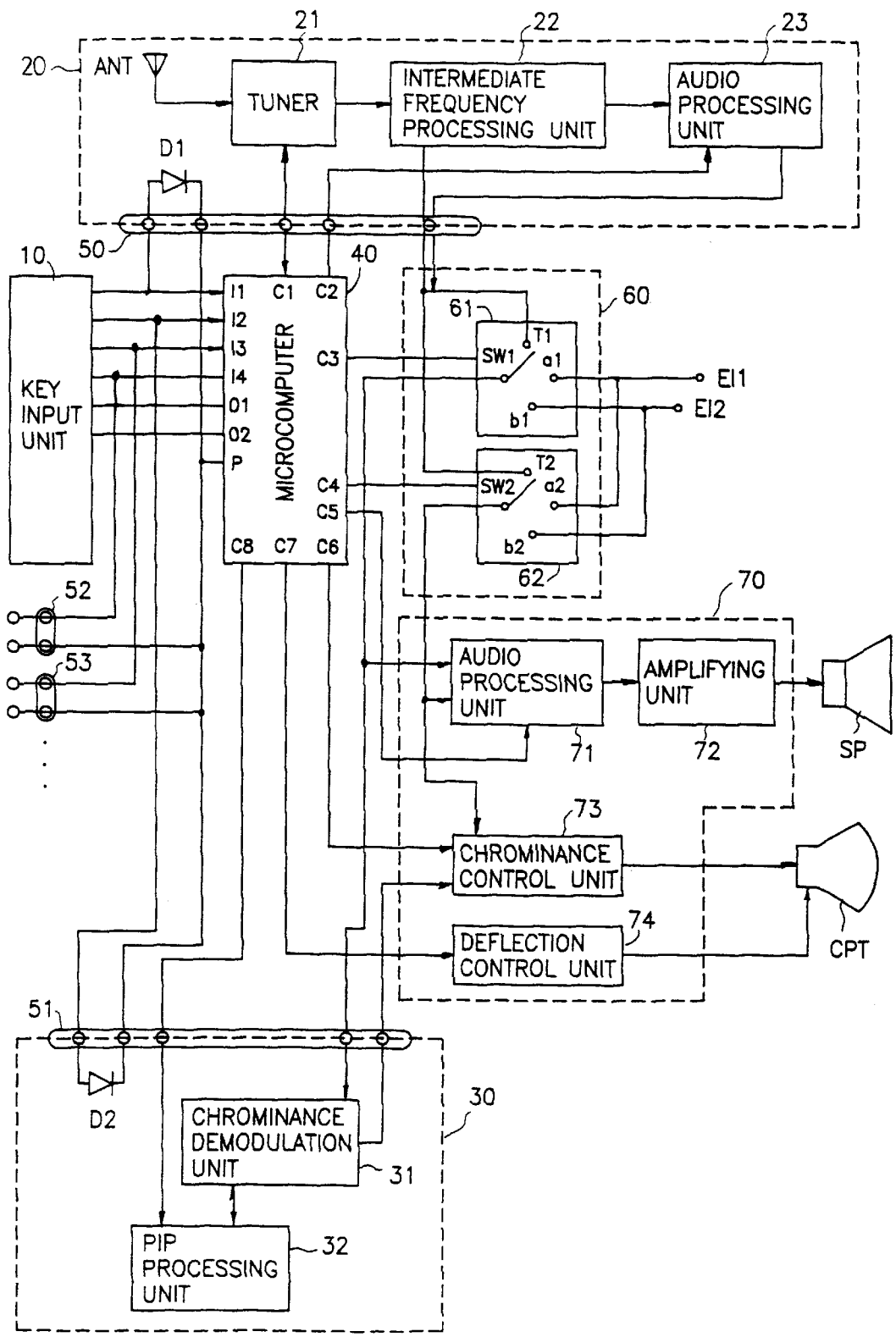
FIG. 2 is a block diagram of an optional operation control apparatus for a monitor according to the present invention.

FIG. 2 shows an optional operation control apparatus for a monitor according to the present invention, which includes a key input unit 10 provided with a plurality of function keys therein, a tuner card 20, a microcomputer 40 for judging whether a PIP card 30 and a plurality of option cards are provided in the system and for controlling a function of a corresponding option card, option card connection units 50–53 for connecting the tuner card 20, the PIP card 30, and the plurality of option cards, a signal selection unit 60, switched in accordance with a control of the microcomputer 40, for selectively outputting a broadcast signal outputted from the tuner card 20, when a tuner card is provided in the system, and a combined video signal inputted thereto through external input terminals EI1 and EI2, and a signal processing unit 70 for processing a combined video signal outputted from the signal selection unit 60 in accordance with a control of the microcomputer 40, outputting to a speaker SP, and displaying on a color picture tube CPT.

The tuner card 20 includes a tuner 21 for tuning a combined video signal received thereto through an antenna ANT in accordance with a control of the microcomputer 40, an intermediate frequency processing unit 22 for processing an intermediate frequency signal of a combined video signal tuned by the tuner 21, an audio processing unit 23 for processing an audio signal of an intermediate frequency signal processed by the intermediate frequency unit 22 in accordance with a control of the microcomputer 40, and a diode D1 for outputting a certain signal to the microcomputer 40 in accordance with a conduction when mounting the tuner card 20 in the system.

The PIP card 30 includes a chrominance demodulation unit 31 for demodulating a video signal of a combined video signal selected by the signal selection unit 60, a PIP processing unit 32 for PIP-processing a video signal demodulated in accordance with a control of the microcomputer 40, and a diode D2 for outputting a certain signal to the microcomputer 40 in accordance with a conduction when mounting a PIP card 30 in the system.

The signal selection unit 60 includes first and second switch units 60, switched in accordance with a control of the microcomputer 40, for outputting a combined video signal outputted from the tuner card 20 and an external combined video signal inputted thereto through the external input terminals EI1 and EI2.

The signal processing unit 70 includes an audio processing unit 71 for processing an audio signal of a combined video signal selected by the signal selection unit 60 in accordance with a control of the microcomputer 40, an amplifying unit 72 for amplifying an audio signal processed by the audio processing unit 71 to a predetermined level and for outputting to the speaker SP, a chrominance control unit 73 for processing a video signal of a combined video signal selected by the signal selection unit 60 in accordance with a control of the microcomputer 40, displaying on the color picture tube CPT, processing a video signal PIP-processed by the PIP card 30, and displaying on the color picture tube CPT, and a deflection control unit 74 for controlling a deflection of a video signal displayed on the color picture tube CPT in accordance with a control of the microcomputer 40.

Referring to FIG. 5, an optional operation control method for a monitor according to the present invention includes the steps of a first step which resets (S1) the error count to "0", a second step which outputs (S2) a high level signal to output terminals 01 and 02 for scanning the key input unit 10, outputs (S2) a low level signal to an option terminal P, and recognizes (S3) the level of a signal inputted to the input terminals I1–I4, a third step which outputs (S4) a high level signal to the option terminal P, compares (S5–S7) the level of an output signal of the option terminal P with a level of the recognized signal, and judges whether an option card is mounted based on a result of the comparison, a fourth step which judges that the option card is not mounted in the system, and performs a monitor function when the levels of the signals are different from each other as a result of the comparison (S5–S7) of the third step, and a fifth step which judges that a tuner card 20, a PIP card 30, or a plurality of option cards is mounted in the system and controls a corresponding function of the mounted card (S8–S10) when the levels of the signals are the same as a result of the comparison (S5–S7) of the third step.

The fourth step includes the steps of a first sub-step which increases (S11) the count value of an error counter by "1", and judges (S12) whether the counting value of the error counter is "10" and a second sub-step repeatedly performs the second and third steps when the counting value of an error count is not "10" as a result of the judgement (S12) of the first sub-step and controls (S14) the operation of the signal processing unit 70 by switching (S13) the second switch unit 62 to an external input terminal (S13) when the error counting value is "10" as a result of the judgement (S12).

The operation of the optional operation control apparatus for a monitor and the method thereof according to the present invention will now be explained in reference to FIGS. 3 and 4A through 4C.

To begin with, as shown in FIG. 2, it is assumed that the tuner card 20 and the PIP card 30 are mounted in the system.

Figure 3:
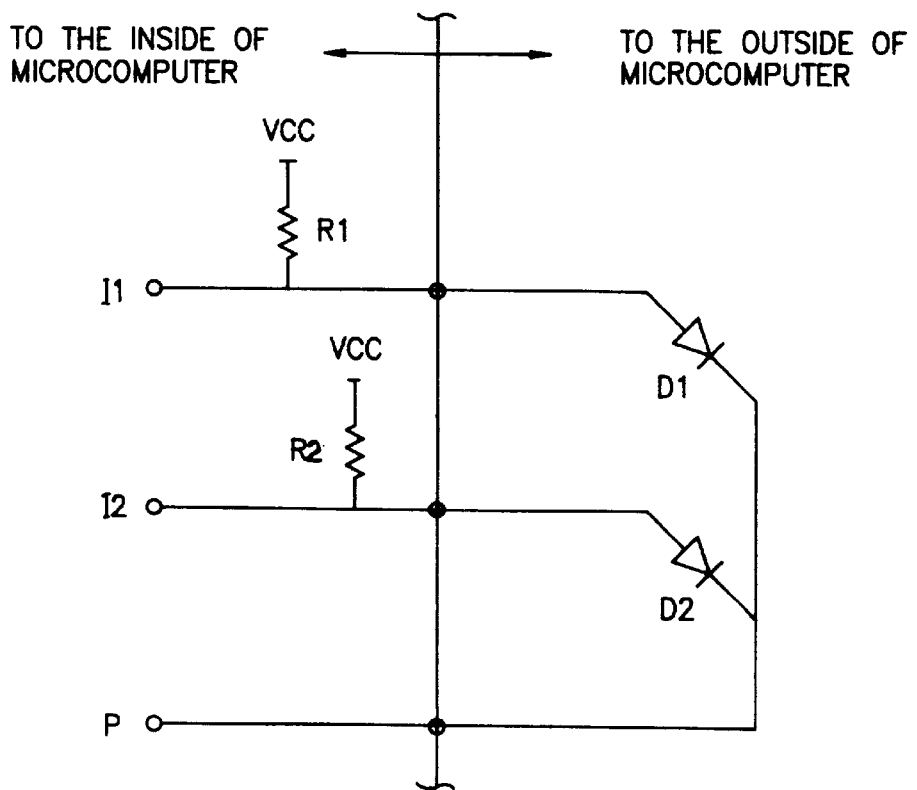
FIG. 3 is a view of an interconnection between a microcomputer and a tuner card and a PIP (picture-in-picture) card when providing a tuner card and a PIP card in the system of FIG. 2 according to the present invention.

Here, FIG. 3 shows an interconnection between a microcomputer and a tuner card and a PIP (picture-in-picture) card when providing a tuner card and a PIP card in the system of FIG. 2, and FIGS. 4A through 4C show wave forms of an input/output signal of a microcomputer of FIG. 2 based on the interconnection state of FIG. 3 according to the present invention.

The microcomputer 40 detects whether an option card is provided in the system at every about 16 ms.

Figure 4A:
FIGS. 4A through 4C are wave forms of an input/output signal of a microcomputer of FIG. 2 based on the interconnection state of FIG. 3 according to the present invention.

That is, the microcomputer 40 resets (S1) the counting value of an error counter (not shown) provided therein to "0", outputs (S2) a high level signal through the output terminals 01 and 02, and outputs a low level signal as shown in FIG. 4A through the option terminal P.

Thereafter, the microcomputer 40 recognizes (S3) a level of an input signal inputted to the input terminals I1 through I4.

That is, since the microcomputer 40 outputs (S2) a low level signal through an option terminal P, an internal voltage VCC of the microcomputer is applied to the option terminal P through a resistor R1, an option card interconnection unit 50, and a diode D1 of the tuner card 20, as shown in FIG. 3.

Figure 4B:

Therefore, a low level signal, as shown in FIG. 4B, is applied to the input terminal I1 of the microcomputer 40.

Figure 4C:

In addition, since the voltage VCC is applied to the option terminal through a resistor R2, an option card interconnection unit 51, and a diode D2 of the PIP card 30, a low level signal, as shown in FIG. 4C, is applied to the input terminal I2 of the microcomputer 40.

The microcomputer 40 recognizes (S3) a low level signal inputted thereto through the input terminals I1 and I2, and recognizes (S3) a high level signal inputted thereto through the input terminals I3 and I4.

Thereafter, the microcomputer 40 outputs (S4) a high level signal through the option terminal P, compares (S5–S7) the level of an input signal of the step S3 with the high level of an output signal of the option terminal P, and judges whether an option card is mounted in the system in accordance with a result of the comparison.

As a result of the step S5, since the low level signal outputted to the input terminals I1 and I2 and the high level signal outputted to the option terminal P are different from each other, the microcomputer 40 judges that the tuner 20 and the PIP card 30 are provided in the system and performs a corresponding function of the tuner card 20 and the PIP card 30.

In more detail, the microcomputer 40 outputs first through eight control signals through the control terminals C1–C8 since the levels between a low level signal inputted to the input terminals I1 and I2 and a high level signal outputted through the option terminal P are different from each other.

A switch SW1 of the first switch unit 61 of the signal selection unit 60 is switched to a movement terminal T1 in accordance with a third control signal outputted from the control terminal C3 of the microcomputer 40, and a switch SW2 of the second switch unit 62 is switched to a movement terminal a2 or a movement terminal b2 in accordance with a fourth control signal outputted from the control terminal C4 of the microcomputer 40.

The tuner 21 of the tuner card 20 tunes a broadcast signal received through an antenna ANT in accordance with a first control signal outputted from the control terminal C1 of the microcomputer 40, and an intermediate frequency signal of the tuned broadcast signal is processed by the intermediate frequency processing unit 22 and is outputted.

The audio processing unit 23 processes an audio signal of an intermediate frequency signal outputted from the intermediate frequency processing unit 22 in accordance with a second control signal outputted from the control terminal C2 of the microcomputer 40.

Therefore, an audio signal of an external combined video signal inputted thereto through the external input terminals EI1 and EI2 is outputted to the speaker SP through the audio processing unit 71 and the amplifying unit 72.

In addition, a video signal of an external combined video signal inputted thereto through the external input terminals EI1 and EI2 is displayed on the color picture tube CPT through the chrominance control unit 73.

Meanwhile, a video signal outputted from the intermediate frequency processing unit 22 is applied to the chrominance control unit 31 of the PIP card 30 through the first switch unit 61, and an audio signal outputted from the audio processing unit 23 is applied to the audio processing unit 71 through the first switch unit 61.

The chrominance demodulation unit 31 demodulates a video signal applied thereto through the first switch unit 61, and the PIP processing unit 32 PIP-processes a video signal outputted from the chrominance demodulation unit 31 in accordance with an eighth control signal outputted from the control terminal C8 of the microcomputer 40.

The PIP-processed video signal is applied to the chrominance control unit through the chrominance demodulation unit 31.

Therefore, the chrominance control unit 73 processes the PIP-processed video signal in accordance with a sixth control signal outputted from the output terminal C6 of the microcomputer 40 and displays on a sub-picture of the color picture tube CPT, and an audio signal applied to the audio processing unit 71 is outputted to the speaker SP through the audio processing unit 71 and the amplifying unit 72.

Meanwhile, as a result of the comparison (S5), when none of the option cards is provided in the system, the microcomputer 40 increases (S11) the counting value of the error counter by "1" and judges (S12) whether the counting value is "10".

As a result of the judgement (S12), when the counting value is not "10", the steps S1 through S12 are sequentially performed, and when the error counting value is "10", the microcomputer 40 outputs a fourth control signal through the control terminal C4, and the switch SW2 of the second switch unit 62 of the signal selection unit 60 is switched (S13) to the movement terminal a2 or the movement terminal b2.

In addition, the microcomputer 40 outputs fifth through seventh control signals through the output terminals C5–C7 and controls (S14) the operation of the signal processing unit 70.

Since the operation control of the signal processing unit 70 is previously described, the operation thereof is omitted.

As described above, the optional operation control apparatus for a monitor and the method thereof are directed to providing a monitor with a broadcasting signal receiving function and a plurality of option functions, so that it is possible to achieve various kinds of desires of users.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An operation control apparatus for a system including a monitor, comprising:

key input means including a plurality of function keys;

a microcomputer for determining which of a plurality of option cards are mounted in the system and for performing corresponding functions associated with those option cards which have been determined to be mounted in the system in accordance with an input signal of said key input means;

first and second switch means, switched in accordance with control signals of said microcomputer, for outputting a combined video signal outputted from an option card, and a combined video signal inputted thereto through an external input terminal; and signal processing means for processing combined video signal outputted from said first and second switch means in accordance with a control of the microcomputer, outputting an audio signal to a speaker, and displaying a video signal on a color picture tube.

2. An operation control method for a system including a monitor comprising:

a first step which resets an error counter to "0";

a second step which outputs a signal having a certain level to a plurality of output terminals of a scanning key input means, outputs a signal having a certain level to an option terminal, and recognizes a level of a signal inputted to a plurality of input terminals, respectively;

a third step which outputs an inverted signal of the signal outputted from said option terminal of said second step, compares the level of a signal recognized by the second step, and judges whether an option card is provided in the system, based on a result of said comparison;

a fourth step which judges that the option card is not provided in the system when levels of the signals are different from each other as a result of the comparison of said third step and controls an operation of the monitor; and a fifth step which judges that at least one option card is provided in the system when the levels of the signals are the same as a result of the comparison of the third step and controls an operation of the provided option card.

3. An apparatus for controlling an execution of a modular television capable of performing optional functions, comprising:

a key input means including a plurality of function keys;

a plurality of option cards segregated and connected by user's choice according to respective functions thereof;

an interface unit for connecting the plurality of option cards with a modular television body;

a microcomputer for scanning a connection state of said interface unit at certain period automatically, determining whether any of said option cards are mounted, and controlling a general operation of the modular television based on said scanning; and the modular television body including a display unit.

4. A method for controlling an execution of a modular television capable of performing optional functions, comprising the steps of:

determining which one of a plurality of option cards is mounted in the modular television;

monitoring a proper function which is associated with a picture appliance when it is determined that there is no option card mounted; and carrying out the function of said option card found to be mounted in the modular television when it is determined which kind of option card is mounted.

5. The method of claim 4, wherein in said determining step, a high level signal is outputted to a keyscan output terminal in a microcomputer used for said determining step, a low level signal is outputted to an option terminal of the microcomputer, and the mounting of a corresponding option card is verified when a signal read from a keyscan input terminal in the microcomputer is at a low level.

* * * * *